United States Patent
Dunn et al.

(10) Patent No.: US 9,547,133 B2
(45) Date of Patent: Jan. 17, 2017

(54) LED ILLUMINATOR FOR SIDE-EMITTING OPTICAL FIBERS

(75) Inventors: Malcolm Harry Dunn, Fife (GB); Graham M. Miller, Dundee (GB); Donald Walker, Fife (GB)

(73) Assignee: UNIVERSITY COURT OF THE UNIVERSITY OF ST ANDREWS, ST ANDREWS (GB)

(*) Notice: Subject to any disclaimer, the term of this patent is extended or adjusted under 35 U.S.C. 154(b) by 770 days.

(21) Appl. No.: 13/634,507

(22) PCT Filed: Mar. 30, 2011

(86) PCT No.: PCT/GB2011/000481
§ 371 (c)(1),
(2), (4) Date: Nov. 26, 2012

(87) PCT Pub. No.: WO2011/121290
PCT Pub. Date: Oct. 6, 2011

(65) Prior Publication Data
US 2013/0064556 A1    Mar. 14, 2013
US 2013/0272720 A9    Oct. 17, 2013

(30) Foreign Application Priority Data

Mar. 31, 2010 (GB) .................................. 1005485.6
Feb. 4, 2011 (GB) .................................. 1101927.0

(51) Int. Cl.
G02B 6/42    (2006.01)
G02B 6/38    (2006.01)
(Continued)

(52) U.S. Cl.
CPC ........... *G02B 6/3816* (2013.01); *G02B 6/0006* (2013.01); *G02B 6/0008* (2013.01); *G02B 6/4248* (2013.01);
(Continued)

(58) Field of Classification Search
CPC .... F21V 21/30; F21V 2101/02; F21V 15/013; F21S 48/215; F21S 48/328; F21Y 2101/02
See application file for complete search history.

(56) References Cited

U.S. PATENT DOCUMENTS 2,002,107 A * 5/1935 Bourret .................... B67D 7/38
                                                        362/267
2,860,236 A * 11/1958 Moore .................... F21V 25/12
                                                        362/264
(Continued)

FOREIGN PATENT DOCUMENTS

GB    1523163    8/1978
GB    2214004    8/1989
(Continued)

OTHER PUBLICATIONS

International Search Report for PCT/GB2011/000481, dated Nov. 9, 2011.
(Continued)

*Primary Examiner* — Ismael Negron
(74) *Attorney, Agent, or Firm* — Moore & Van Allen PLLC; W. Kevin Ransom (57) ABSTRACT

An optical device comprising a sealed waterproof housing comprising at least one LED disposed within the housing; a transparent window to allow light from the LED to be emitted from the housing; a non-imaging light element for coupling light from the LED into a plurality of side emitting optical fibers connected to the housing; and a fixing portion for securing the plurality of side-emitting optical fibers into a coupling position adjacent to the window to allow light to pass between the housing and the plurality of optical fibers, via the transparent window. The fixing portion is adapted to allow connection and/or disconnection of the plurality of (Continued)

optical fibers without opening or breaking a seal of the sealed waterproof housing.

23 Claims, 9 Drawing Sheets

(51) Int. Cl.
  *F21V 8/00* (2006.01)
  *G02B 6/40* (2006.01)
(52) U.S. Cl.
  CPC .......... *G02B 6/3891* (2013.01); *G02B 6/3897* (2013.01); *G02B 6/403* (2013.01)

(56) References Cited

U.S. PATENT DOCUMENTS

| | | | | |
|---|---|---|---|---|
| 3,612,852 A * | 10/1971 | Bogossian | ............ | F21V 31/005 277/606 |
| 3,766,377 A * | 10/1973 | Junginger | ............... | F21V 29/02 362/232 |
| 3,948,582 A * | 4/1976 | Martin | ............ | 385/88 |
| 4,307,934 A * | 12/1981 | Palmer | ................. | G02B 6/4204 250/227.24 |
| 4,342,071 A * | 7/1982 | Chamberlain | ............ | F21S 8/00 362/158 |
| 4,814,948 A * | 3/1989 | Hasegawa | ............... | G09F 9/305 362/455 |
| 5,140,216 A * | 8/1992 | Darr | ...................... | F21L 14/026 313/25 |
| 5,347,605 A * | 9/1994 | Isaksson | .............. | G02B 6/4204 385/90 |
| 5,353,294 A * | 10/1994 | Shigeno | ......................... | 385/93 |
| 5,452,389 A * | 9/1995 | Tonai et al. | ..................... | 385/92 |
| 5,526,455 A * | 6/1996 | Akita et al. | ..................... | 385/93 |
| 5,537,503 A * | 7/1996 | Tojo et al. | ..................... | 385/93 |
| 5,537,504 A * | 7/1996 | Cina et al. | ..................... | 385/93 |
| 5,821,695 A * | 10/1998 | Vilanilam | ............... | F21V 25/12 315/58 |
| 5,852,697 A * | 12/1998 | Williams et al. | ................ | 385/93 |
| 6,144,787 A * | 11/2000 | Johnston et al. | ............... | 385/31 |
| 6,572,280 B2 * | 6/2003 | Hurt et al. | ..................... | 385/92 |
| 6,742,916 B1 * | 6/2004 | Dunn | ...................... | B60Q 1/32 114/343 |
| 7,296,938 B1 * | 11/2007 | Shapson et al. | ................ | 385/92 |
| 7,296,939 B2 * | 11/2007 | Sonoda | ............... | G02B 6/4248 385/88 |
| 7,296,989 B2 * | 11/2007 | King | .......................... | 425/326.1 |
| 7,420,754 B2 * | 9/2008 | Nagasaka | ....................... | 385/88 |
| 7,641,358 B1 * | 1/2010 | Smith | ....................... | F21L 4/08 315/307 |
| 2003/0001164 A1 | 1/2003 | Fujihara et al. | | |
| 2006/0018609 A1 | 1/2006 | Sonoda et al. | | |

FOREIGN PATENT DOCUMENTS

| | | |
|---|---|---|
| JP | 2000180733 A * | 6/2000 |
| WO | WO96/35928 | 11/1996 |
| WO | WO2006/026720 | 6/2006 |

OTHER PUBLICATIONS

UK Search Report issued in GB Application No. 1005485.6, dated Jul. 27, 2010.

* cited by examiner

LED ILLUMINATOR FOR SIDE-EMITTING OPTICAL FIBERS

FIELD OF THE INVENTION

The present invention is concerned with an optical light source or box for supplying light to a distributed illumination system based on side emitting optical fiber or fiber bundles. The source is adapted for use under adverse and challenging environmental conditions. The invention also relates to an integrated illuminator and in particular an integrated fiber based illuminator for use for illumination and/or communications.

BACKGROUND OF THE INVENTION

Side emitting optical fibers or fiber bundles that are illuminated by primary optical sources placed only at the ends of the fibers are recognized as practical and convenient methods for distributed illumination. They provide inherently safe illumination that is continuous and flexible, since the illumination is distributed along the full length of the fibers or fiber bundles. These sources require no electrical power to be provided within the structure of the fiber or fiber bundle itself, since the primary optical sources that do require electrical supply are located only at the end or ends of the side emitting fibers or fiber bundles.

Side emitting fibers or fiber bundles can provide high intensity light at peak eye response, as well as light of other colors as required. They are particularly appropriate for use in hazardous environments, for example in chemical or oil refining plants, mines, wellheads, and oil-rig platforms, where illumination methodologies involving the supply of electrical power within the hazardous environments can lead to risk of explosions. They also lend themselves to use in underwater environments, for example, subsea and any inland water including lakes, rivers, lochs, harbors, docks, canals and all other types of waterways, including in aquaculture, as well as in many other environmentally challenging situations. In addition, they are ideal for providing egress/guide-path lighting and safety lighting, for example for illuminating clear paths to exits. This results from the distributed and continuous nature of the source along the length of the fiber or fiber bundle. Furthermore, such sources can also serve the dual purpose of illumination and communication, where information is dispersed through appropriate modulation of the emitted light.

Side emitting fibers or fiber bundles are used with optical sources, which generally are associated with electrical/electronic components. Using such devices in hazardous/challenging environments can be problematic, as the environment in which the electrical/electronic/optical components forming the primary optical source are located has to be isolated from the external environment to which the side emitting fiber or fiber bundle is itself subject. Furthermore, the sealing integrity between the fiber and the electrical environments has to be sustained during installation, usage, servicing and replacement. In practice, locating and retaining the fiber relative to the primary light source can be difficult. Also, there can be problems with optimizing the coupling of radiation from the primary light source into the fiber/fiber bundle, and isolating the primary light source, including protection from dangerous environments. Efficient management of heat removal from the primary light source is a further challenge.

SUMMARY OF THE INVENTION

According to one aspect of the invention, there is provided an optical device comprising a housing; a light source and/or a detector within the housing; a window through the housing that is transparent to light transmitted from the light source or to the detector and a fixing for fixing an optical fiber or bundle of such fibers into a coupling position adjacent the window to allow light to pass between the housing and the fiber or fiber bundle. The fixing is such that it allows connection and disconnection of the fiber or fiber bundle without breaking seals to the housing or light box.

Light generated within the housing is transmitted through an optical interface directly into the fiber(s). The use of an external fixing for securing the fiber or fiber bundle in place means that the light-box can be sealed for coupling and uncoupling to the optical fiber or fiber bundle. This means that the integrity of any optical, electronic or other components within the housing can be maintained.

The fixing may hold the optical fiber or bundle of fibers in butt coupled contact with an external surface of the window. The fixing may be adapted to compress the fiber end against the window. The fixing may be adapted to mate with a fixing element on the fiber or fiber bundle. The fixing may comprise a male part and a female part, one being on the housing and the other being on the fiber or fiber bundle. The fixing may comprise a bayonet connector.

Within the housing, a heat sink may be provided. Within the housing a non-imaging light concentrator may be provided for directing light from the light source to the fiber and/or for the purpose of optimally coupling the light into the fiber. Alternatively, the non-imaging concentrator may be employed for directing light from the fiber to the detector and/or for the purpose of optimally coupling the light into the detector.

The light source and the window may be integrated. Where a heat sink and a nonimaging light concentrator are provided, the light source, the window and the heat sink and/or the non-imaging light concentrator may be integrated. The integrated components may form a composite structure that has a depth of less than 15 mm, preferably 13 mm or less. The housing may have a lid and a body portion and the integrated parts may be located in the lid.

The housing may be waterproof and/or fireproof and/or explosion proof (Ex) and/or pressurized for operation at depths.

The device may be adapted for use with one or more side emitting optical fibers. Where a plurality of side emitting optical fibers is used, these may be bundled together, typically twisted together, and encased in a transparent plastic sheath. Alternatively, the individual fibers may be braided into a fiber ribbon. The ribbon may have a flat or circular cross-section.

The light coupled into the fiber may be shaped so that it substantially fills the fiber rope. The light coupled into the fiber may have a substantially uniform power distribution.

According to another aspect of the invention, there is provided a composite/integrated optical device comprising a light source; a window for transmitting light from the source; and a heat sink. The device may also have an integral light concentrator, for example a non-imaging light concentrator.

BRIEF DESCRIPTION OF THE DRAWINGS

Various aspects of the present invention will now be described with reference to the accompanying drawings, of which.

BRIEF DESCRIPTION OF THE DRAWINGS

Figure 1:
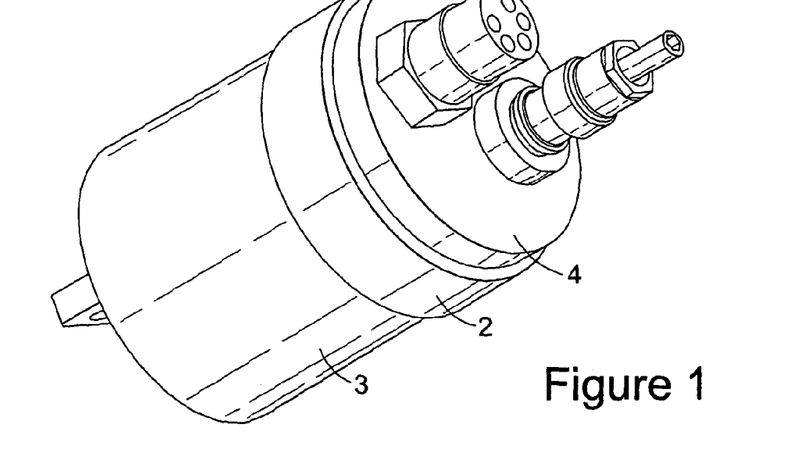
FIG. 1 shows a perspective view of an integrated illuminator.
Figure 2:
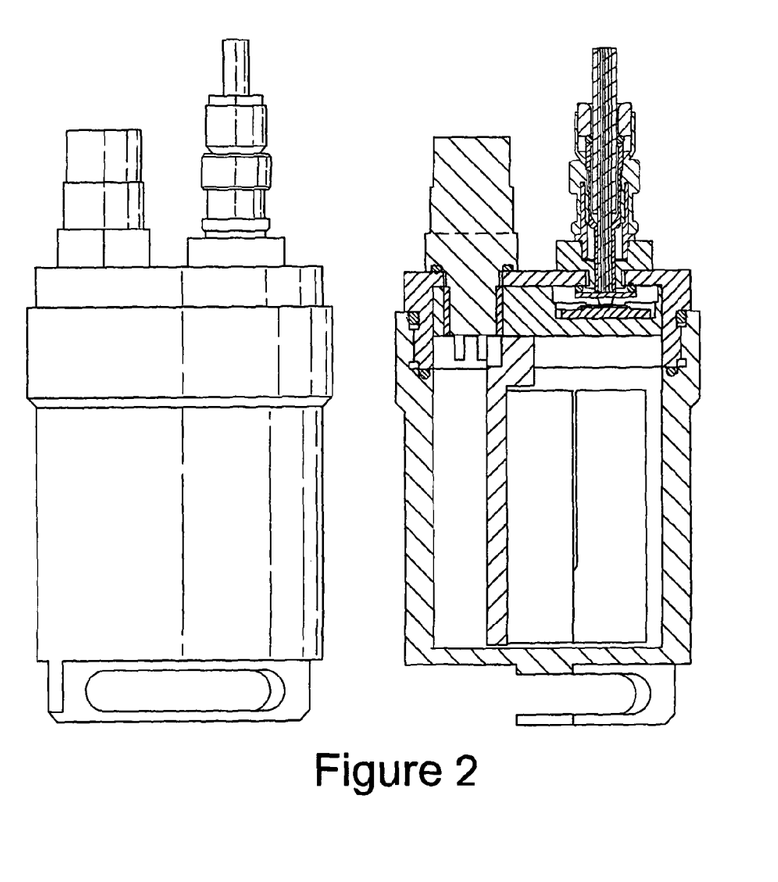
FIG. 2 shows a side and a sectional view of the integrated illuminator of FIG. 1.
Figure 3:
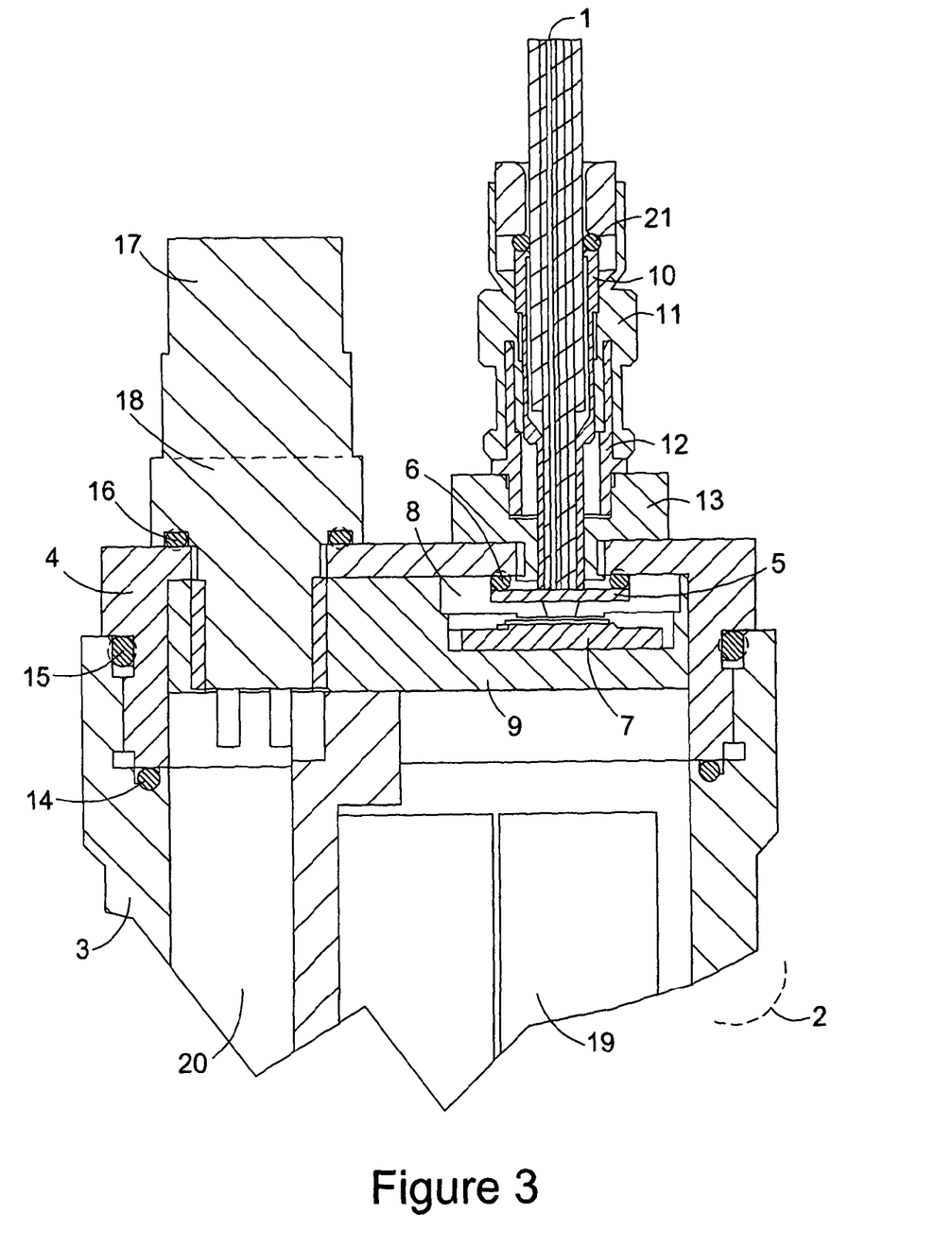
FIG. 3 shows a section through a top portion of the integrated illuminator of FIG. 2.

FIGS. 1 to 3 show a fiber based illuminator that has a sealed light source unit and a fiber that can be releasably coupled to the light source unit without having to open or break any seal, thereby maintaining the sealing integrity of the light source unit. The sealed light source unit has a housing 2, which has a main body 3 and a lid 4. The lid 4 is threaded to the body 3 and sealed using two seals: a main seal 14 and a secondary seal 15. The body 3 and lid 4 may be made of any suitable material, for example, aluminum alloy.

Within the body 3 is a primary light source 7. This is mounted on a heat-sink interface 9, see FIG. 3. At the output of the primary light source 7 is a conical non-imaging light concentrator 8. This directs light through an optical window 5 and provides an integrated support for the window. The non-imaging light concentrator may be adapted to ensure that light coupled into the fiber or fiber bundle substantially fills the fiber or fiber bundle and/or may be adapted to optimize the light power coupled into the fiber or fiber bundle. The light may have a substantially uniform power distribution.

The optical window 5 is transmissive to light from the source 7 and is positioned adjacent an opening through the lid 4, so that light can pass from the interior of the sealed housing to the exterior. On an upper surface of the optical window 5, a seal 6 is provided. This is sized to match the opening through the lid 4 and to form a seal to ensure that interior of the housing is isolated.

Figure 4:
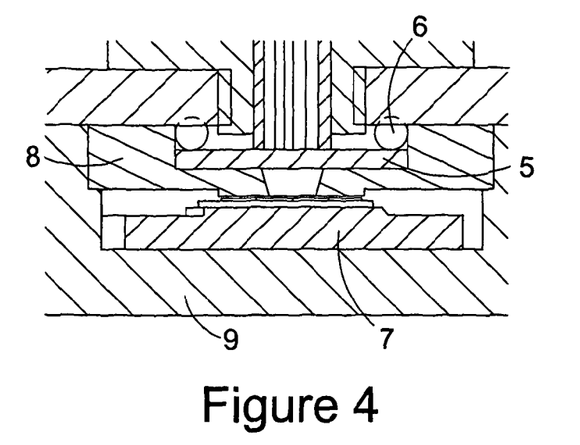
FIG. 4 shows an expanded view of a composite structure used in the illuminator of FIG. 3.

The primary light source 7, the integrated heat-sink interface 9, the conical non-imaging light concentrator 8, and the optical window 5 together form a composite, integrated structure, as shown in FIG. 4. The depth of this structure may be 13 mm or less. Typically, the composite structure is formed as a separate unit for insertion into the lid 4, thereby simplifying manufacture. Doing this means the unit can be readily adapted for different environments without needing a product re-design every time. This is because the window of the structure can be varied depending on the strength needed for a particular environment.

The composite structure integrates the functionalities of: matching the primary light source with the characteristics of the fiber through the conical non-imaging light concentrator; retaining and locating the window; securely positioning the primary light source; providing when assembled an efficient heat-sink, and sealing the window thereby affording protection of the light source and other components from the external environment.

To power the primary light source 7, a constant current driver 20 and a battery 19 are provided. In addition, an electrical connector (male/female) 18 is sealed to the canister lid 4 using seal 16. The electrical connector 18 can be any suitable electrical wet connect. These are well known and so will not be described in detail. Power can be provided by the battery or through the electrical cable 17.

Although not shown, other electronics could be provided within the sealed environment of the housing, for example, a control system for controlling light emission. Also, means may be provided for sending and/or receiving at least one data carrying optical signal along the light rope. In this case, the fiber or fiber bundle assumes a dual functionality in providing both illumination and communications. The means for sending at least one data carrying optical signal along the fiber may modulate light from the light source 7, the modulation representing the data-carrying signal and/or by injecting data carrying light from another source (not shown) into the fiber. To implement and/or control communications a processor may be provided inside the housing.

Figure 5:
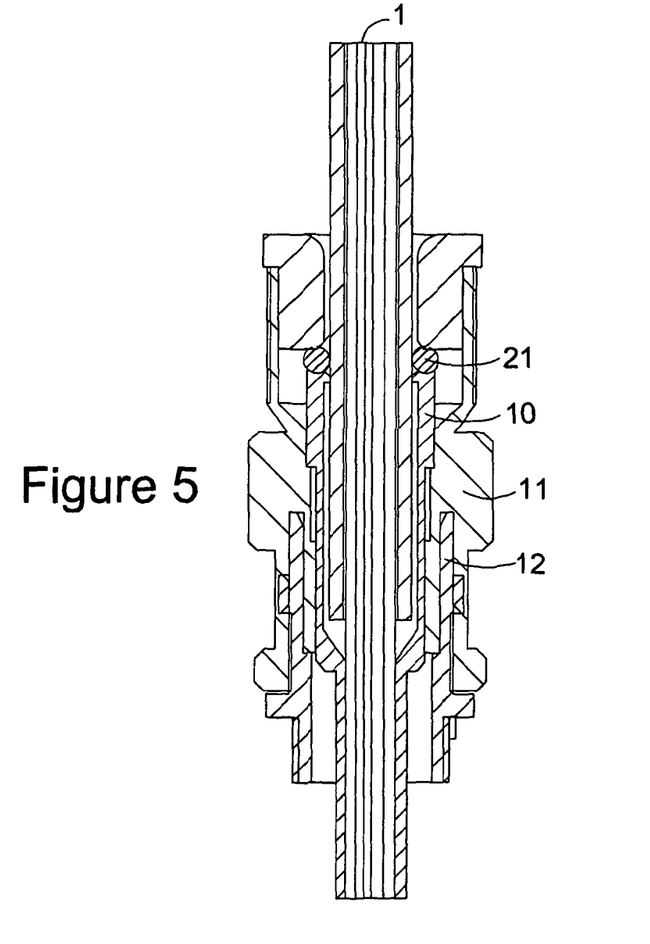
FIG. 5 shows an expanded view of a locking arrangement used in the Illuminator of FIG. 3.

To allow an optical fiber or fiber bundle to be connected to the light source unit, a quick release positive fiber locking mechanism is provided, with one part on the lid 4 and the other on the end of the fiber.

To position the locking mechanism, the lid 4 has a locator element that has a cylindrical threaded portion that is sized to match a thread in the opening through the lid 4, so it can be threaded into position. The locator element widens out to define a further cylindrical portion, which provides support for a male connector part 12 of the quick release locking mechanism. The male connector 12 is fixed to the locator element and has a bayonet mount connection for mating with a corresponding female connector element 11, which extends round the optical fiber. The male and female connector elements interact to position the fiber 1 securely on the lid. The height of the locator element, the size of the connector parts and the position of the end of the fiber(s) are selected so that when the male and female parts are connected the ends of the fiber are in contact with the window 5 and maintain good fiber/window interface. In some embodiments, the arrangement is such that the end of the fiber or fiber bundle is in direct contact with the window.

Using a simple bayonet fitting ensures quick, accurate and repeatable high performance optical connection of the fiber to the light source unit, whilst maintaining the sealed environment within the unit.

The light source unit is provided as a fully sealed/closed unit, which, depending on the application may be waterproof and/or fireproof and/or explosion proof (Ex). To connect a fiber to the unit, a user merely has to use the simple press mechanism of the bayonet connector. There is no need to open or break the seal of the housing to make the connection. Instead, the connection is made entirely externally. The physical relationship between the integrated light source and window, and the connecter ensures accurate alignment of the fiber or fiber bundle with the output of the light source. Because of the sealed nature of the unit, the fiber can be connected above or below water.

An illumination unit in accordance with the invention has been made and pressure tested to a depth of 1000 m. In these tests, the unit was made of marine grade aluminum alloy.

The illuminator of the present invention can be used in numerous applications. For example in hazardous environments; underwater including ROV and derivatives; umbilical (all environments); distributed communications; safety; escape/guide path; marine; offshore including helipads; petrochemical; mines; tunnels; wind generation facilities both on and off shore; tidal and wave generation, and aquafarming. Also, it can be used with end and/or side emitting fiber and or fiber bundles for the purpose of illumination, communication and dual functionality of illumination and communication.

Figure 6:
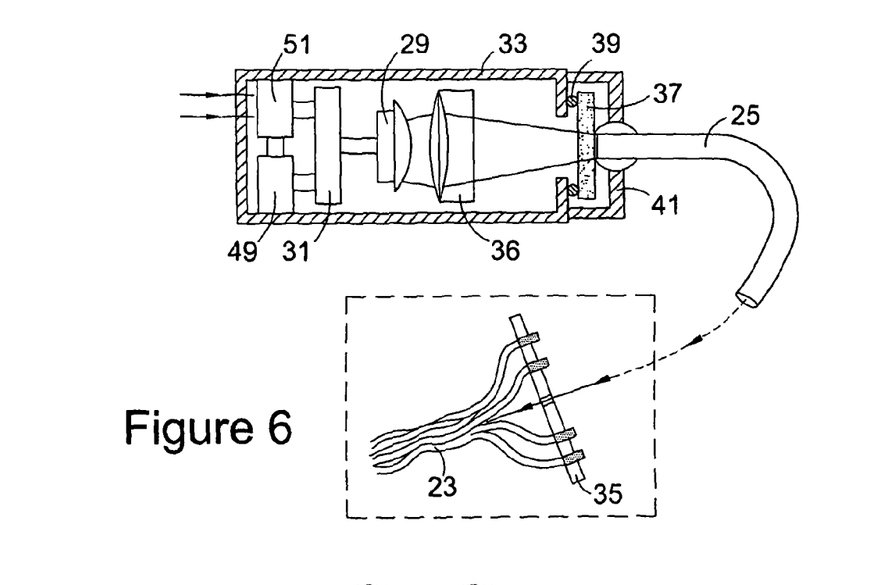
FIG. 6 is a schematic representation of a light rope umbilical system.
Figure 7:
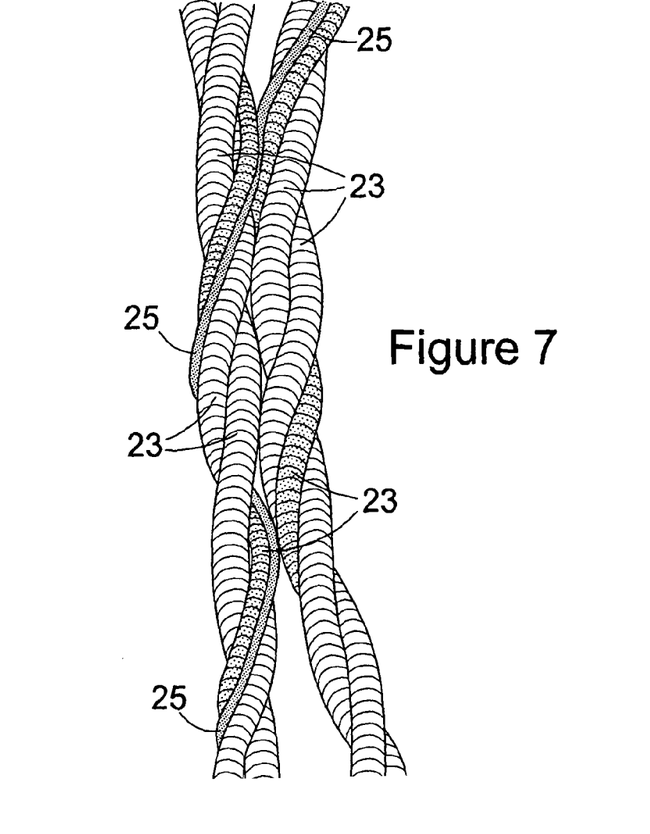
FIG. 7 is the view of the fiber bundle as incorporated within the umbilical.

As a specific example the illuminator of the invention can be used in an underwater umbilical system. FIGS. 6 and 7 illustrate an umbilical. This has various conventional umbilical parts 23 wound together, such as a gas hose and a power line, as best seen in FIG. 7. In addition, the umbilical includes a fiber bundle 25 that has multiple side-emitting optical fibers 27. The side emitting optical fibers 27 provide a distributed source of light that allows the umbilical to be lit along its length, thereby providing a guide-path as well as general illumination of the subsea environment within which the diver or divers are working.

A light emitting diode (LED) 29 powered by a driver 31 is provided for illuminating the rope. The LED 29 is enclosed within a compact watertight enclosure or light-box 33 which is located adjacent an umbilical interconnect-interface 35. Radiation from the LED 29 passes through an optical coupling 36 arrangement, which transforms the spatial characteristics of the primary radiation from the LED 29 to optimize its coupling into the fiber-bundle 25. The radiation then passes through a window 37, which is mounted on a water-tight seal 39 on the side of the watertight compartment 33, before entering the fiber-bundle 25. The prepared ends of the fibers making up the bundle 25 are held in compression by element 41 so as to be in contact with and butt-coupled to the outer surface of the window 37. The optical arrangement described is such that this location of the fiber-end also optimizes the coupling of the radiation into the fiber.

Whilst any LED may be used, in a preferred example, the LED generates light in the green spectral region. Typically, for an electrical input power to the LED of 12 W, the optical output power from the LED in the green spectral region is of the order of 400 mW, and the coupling efficiency for this radiation into the fiber is of the order of 23-28%.

Figure 8:
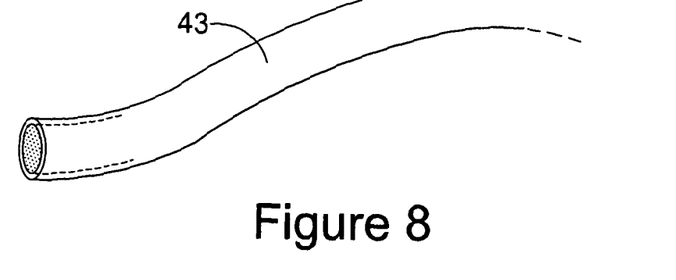
FIG. 8 is a side view of an individual fiber of a light rope for use in the system of FIG. 6.
Figure 9:
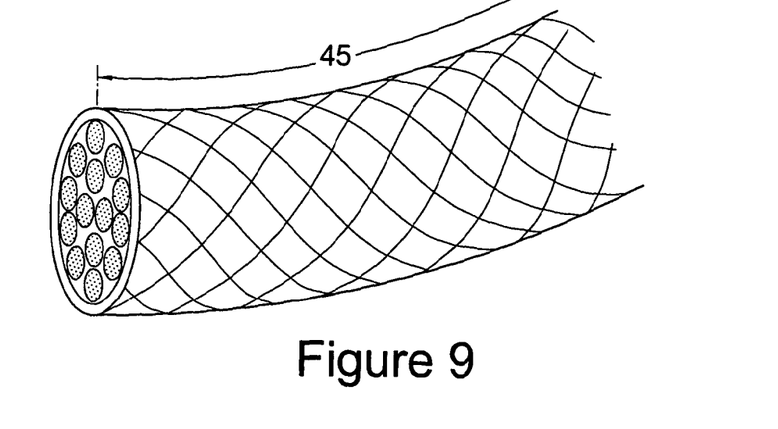
FIG. 9 is a view of the fiber bundle showing a helical pitch.

The fiber bundle may be made up of any number of fibers. In a preferred example, fourteen individual plastic fibers 43 are used with a core diameter of 0.74 mm and refractive index of 1.49, and with an outer cladding of wall thickness 0.06 mm and refractive index 1.40, see FIG. 8. As a specific example these fibers would conform to Eska CK30 fiber. The fibers are wound in a tight helical bundle 45 with a pitch of 10 cm, see FIG. 9. The packing of the fibers as appears at each end of the bundle is of the form of four central fibers surrounded by ten other fibers, all encased within an outer sheath 47 that is transparent to the light that is to be used, see FIG. 10. The plastic sheaf has a nominal wall thickness of 0.85 mm, the walls of the sheaf being transparent to the green radiation. Typically, the fiber bundle is of length 100 m, compatible with a standard umbilical.

Figure 10:
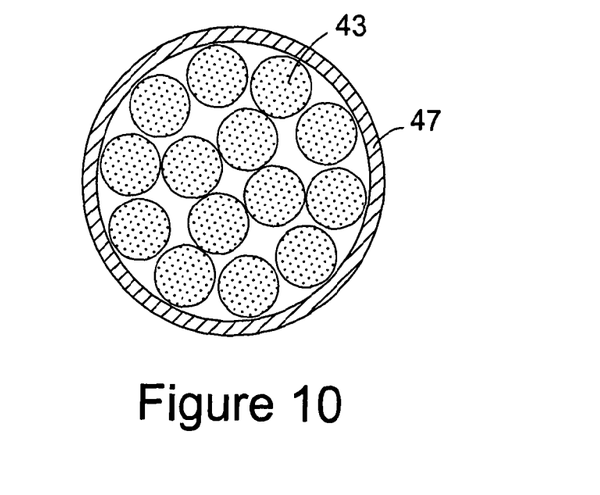
FIG. 10 is an end view of a fiber bundle showing the arrangement of individual fibers and sleeving.

The fiber-bundle geometry of FIG. 10 typically experiences a loss of the order of 5%/m due to radiation escaping through the side walls as required, this being determined both by the tightness of winding and the compression of the bundle by the outer sleeve. Both these aspects are controllable for the purposes of optimization during the manufacturing process. For the specifications given above satisfactory illumination and brightness of emission is attained for fiber lengths up to 100 m. The watertight compartment 33 also contains a back-up battery 49 (3 hours of steady state lighting or six hours on flash) with a built in charger circuit 51. This circuit contains the flash interface which is controlled from the surface by the dive supervisor. This will also allow remote operation in the event on no mains. The system in normal operation requires 12 W@18V DC.

In some circumstances, it may be desirable to allow the injection of light from both ends of the fiber. Another arrangement is where the fiber is illuminated from both ends, namely from the surface end of the fiber as described above and also from the underwater end as attached to the diver. For the latter purpose FIG. 11 shows a compact watertight pressurized light-box 53 designed to operate at depth of typical dimensions 100 mm×50 mm diameter which is attached at the diver end to the fiber and contains a rechargeable battery 55, LED 57, associated driver circuit 59, optical coupling arrangement 61, and output coupling window 63 with facility for butt-coupling the fiber ends as previously.

Figure 11:
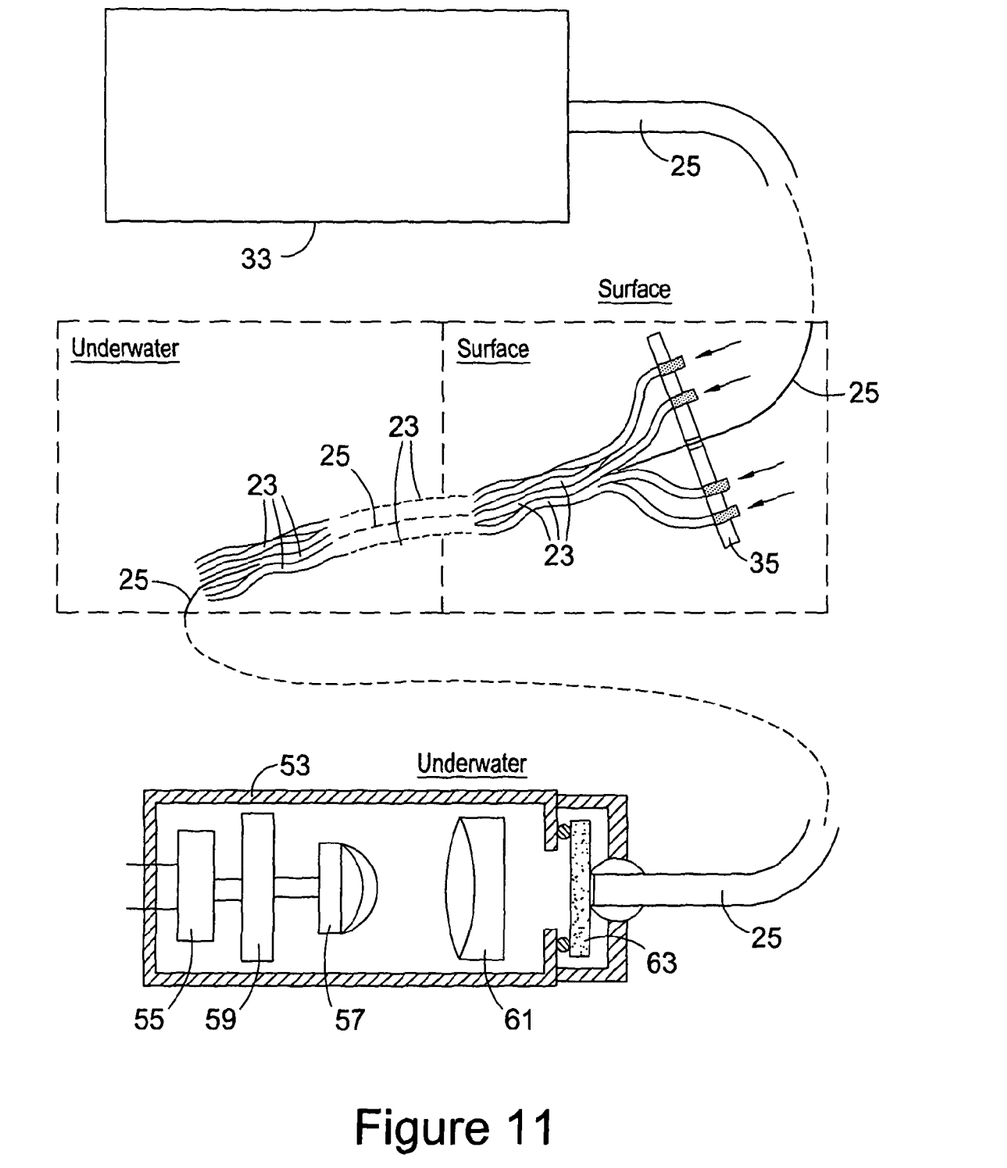
FIG. 11 shows the illuminator at the diver end and for a fiber bundle umbilical illuminated from both ends.
Figure 12A:
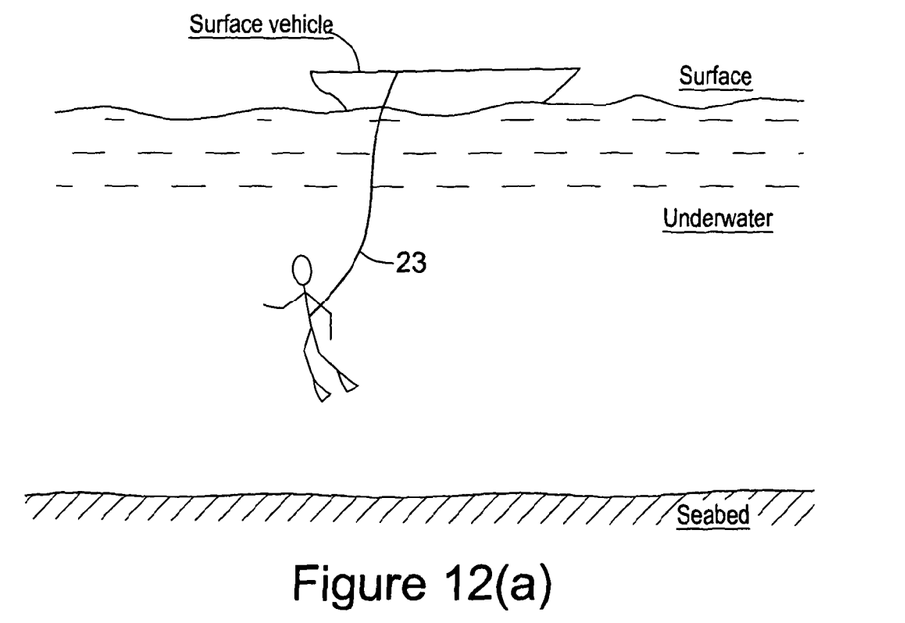
FIG. 12 shows the umbilical in use in various operational environments.
Figure 12B:
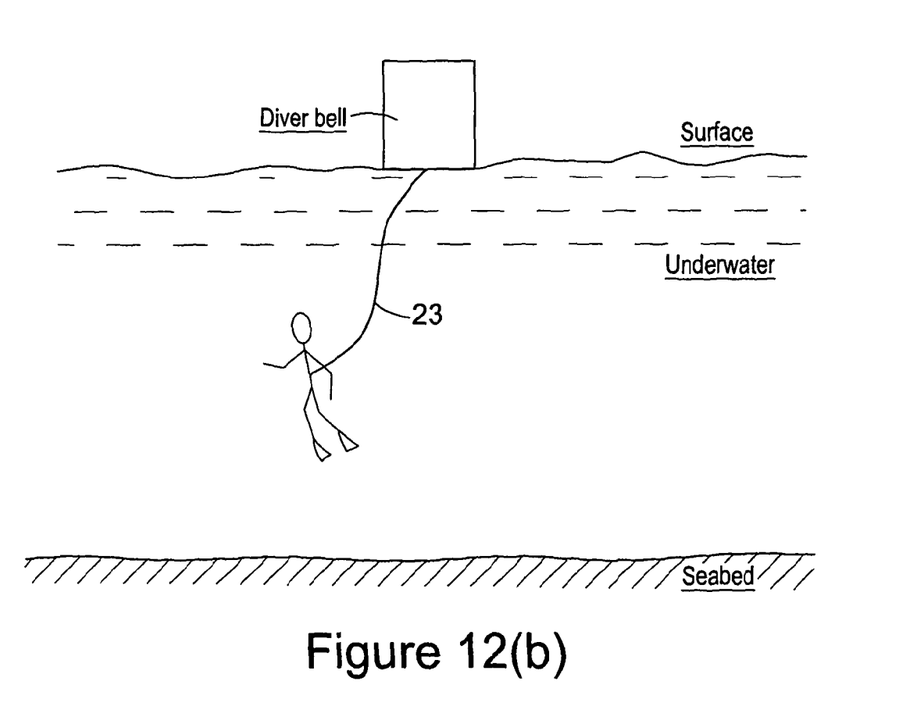
Figure 12C:
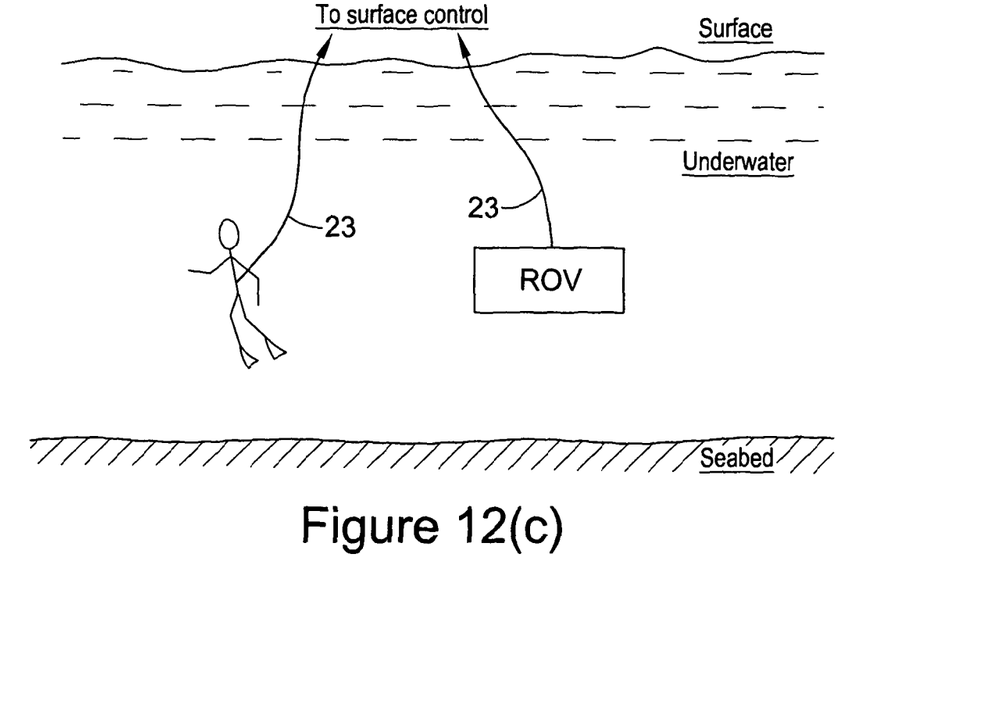
Figure 12D:
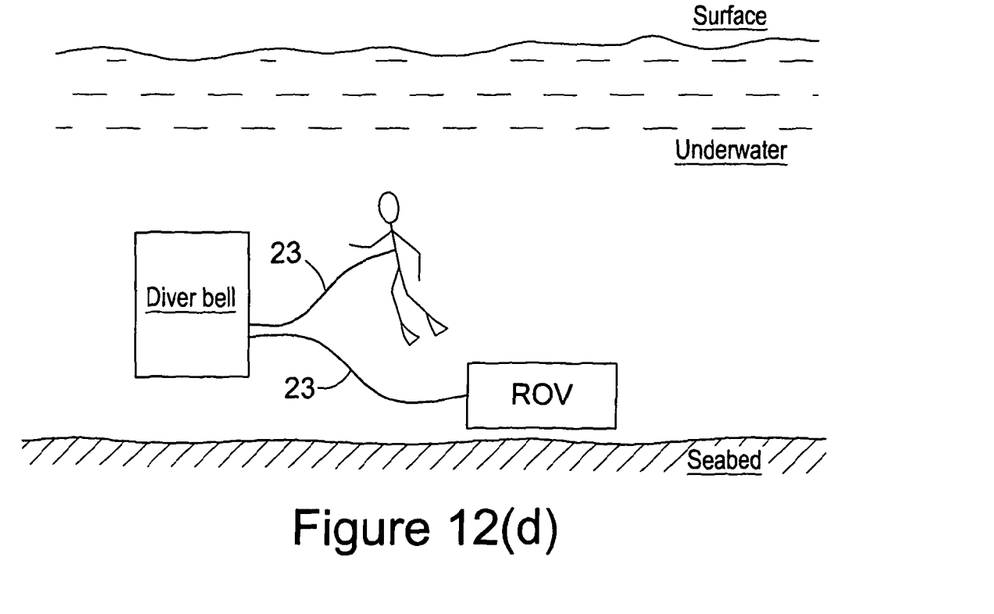

Overall characteristics for the underwater source for use in the arrangement of FIG. 11 regarding optical power into fiber, etc. are similar to the surface based illuminator.

Under normal operating conditions, the system is powered by the diver's electrical supply emanating from the surface and provided by the power cable of the umbilical, but with a battery back-up of one hour. This arrangement significantly increases illumination levels in the vicinity of the diver(s), and provides back-up through built-in redundancy in the event of fiber damage or light source failure. It can also significantly increase umbilical operational length.

The light injected into the fiber bundle may be modulated so as to carry a message or information. The modulation of light may be such that it can be seen directly by eye, for example in the case of a general warning message. Alternatively or additionally, an optical receiver capable of decoding the modulated message may be provided for subsequent oral, visual or other mode of presentation to divers or other relevant parties.

A controller (not shown) may be provided at one or both ends of the umbilical to cause the light emitted from the fibers to be altered. For example, the light could be caused to flash on and off. This could be used by divers in emergency situations to provide a general warning, for example, highlighting a change in operational conditions or a specific diver in difficulty, thereby making colleagues immediately aware of a change state. A lit and flashing umbilical could speed up rescue operations in identifying the diver at risk.

FIG. 12 shows various different operational environments in which the umbilical could be used. These include between the surface and a subsea location (surface-air diving application), FIG. 12(*a*) or between a diving bell and individual divers (saturation diving), FIG. 12(*b*). It may also be used between two or more subsea locations for example in connection with remote operating vehicles (ROVs) FIG. 12(*c*).

Figure 13:
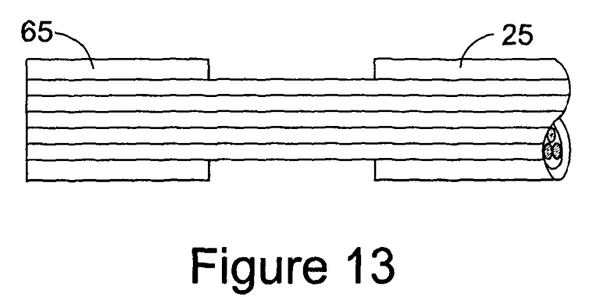
FIG. 13 shows a fiber ferrule clamp arrangement.

Although FIG. 11 shows a simple compression element, any suitable external fixing element could be used to releasably secure the fiber or fiber bundle in place. For example, FIG. 13 shows a fiber termination arrangement where the fiber bundle with individual fibers is retained within a compression ferrule 65 that holds the fibers in a given orientation and with a square end face for efficient butt coupling to the light source or optical window.

Figure 14:
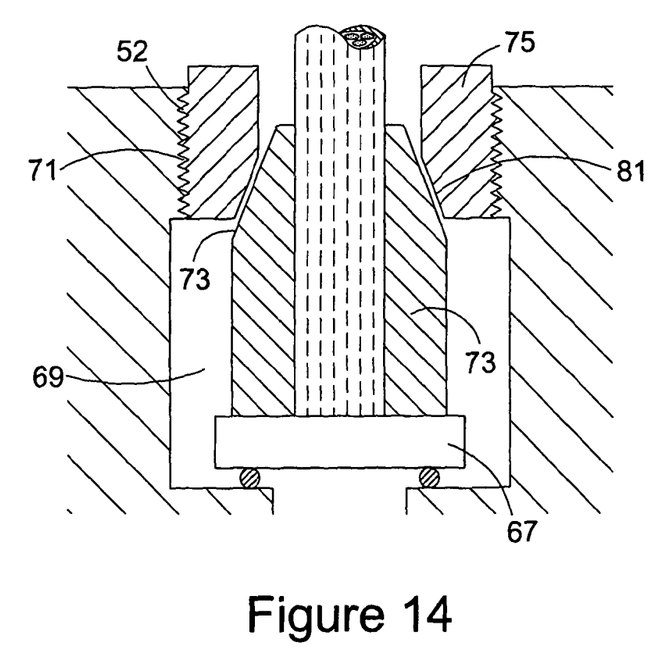
FIG. 14 shows a controlled compression system.

FIG. 14 shows another coupling assembly utilizing a controlled compression system where the fiber is held against the output coupling window 67 and uses a tapered clamp arrangement 69 that allows uniform compression on the fiber bundle while retaining the fiber against the window 67. In this case, the optical coupling window 67 is provided in a tubular recess in the housing that has a screw thread 71 formed at one end. Mounted against the window 67 is a tubular part 73 that is shaped to receive the end section of the fiber bundle, so that light can pass through the window between the interior of the housing and the ends of the fibers. The external surface of the end of the tube remote from the window is tapered, to form an inwardly sloping surface 73. This is shaped to mate with a fixing element. The fixing element 75 has an externally formed screw thread 77 matched to the screw thread 79 on the housing and a tapered surface 81 matched to the taper 73 on the tubular part.

In use, the fiber bundle can be coupled to the light box by inserting it into the tubular part until the end of the fiber bundle makes contact with the window. By applying a screwing action by means of the fixing element 75 compression is applied to the tubular part through engagement of the tapered surfaces 73 and 81, thereby transferring linear compression both through the fiber bundle and through the tubular part to the window. This ensures good butt coupling and hence optical interface to the window, while simultaneously applying radial compression to the fiber bundle hence retaining the fiber bundle in its position against the window.

The coupling arrangement(s) outlined can be utilized in a variety of applications that require efficient light injection and or ability to connect/disconnect rapidly without breaking the sealing arrangement of the light-box device.

The present invention provides a safe, low-power light-source that can be readily coupled into a side emitting fiber rope to provide a continuous, flexible and distributed along the full length of the umbilical. The source can be used in any underwater environment for example subsea and any inland waters including lakes, rivers, lochs, harbors, docks, canals and all other types of waterways. The source requires no electrical power within the structure of the umbilical itself and can provide high intensity light at the peak eye response, as well as light of other colors if required. It provides a clear return path back to safety resulting from the distributed and continuous nature of the source along the length of the umbilical. It provides visual information between divers as to their relative locations in the subsea environment, as well as general illumination of the underwater working environment thereby increasing the visual acuity of operatives so improving both their safety and their efficiency of working.

A skilled person will appreciate that variations of the disclosed arrangements are possible without departing from the invention. For example, although the invention is described with reference to a bundle or ribbon of fibers, a single fiber or a light pipe may be used. Also, the fiber (bundle, ribbon, single or otherwise) may be provided as part of a material or a garment. For example, the fiber may be integrated into a wearable item, such as an item of clothing, e.g. safety apparel. The wavelength of the radiation generated by the laser may be shifted in frequency by some optically non linear technique so as to be suited to the purpose. Whilst green is a preferred color any spectral color may be used. Accordingly the above description of the specific embodiment is made by way of example only and not for the purposes of limitation. It will be clear to the skilled person that minor modifications may be made without significant changes to the operation described.

The invention claimed is:

1. An optical device comprising:
   a sealed waterproof housing;
   at least one light emitting diode located within the waterproof housing;
   a transparent window through which light emitted by the light emitting diode is transmitted; and
   a fixing portion for securing a plurality of side emitting optical fiber into a coupling position adjacent to the window to allow light from the at least one light emitting diode to pass to the plurality of side emitting optical fibers, wherein the fixing portion is adapted to allow connection and disconnection of the plurality of side emitting optical fibers without opening or breaking a seal of the housing; and
   a non-imaging light element in the housing for coupling light from the light emitting diode into the plurality of side emitting optical fibers, said non-imaging light element configured to couple light into the plurality of side emitting optical fibers so as to shape the light to substantially fill the fibers with light from the at least one light emitting diode.

2. The optical device as claimed in claim 1 wherein a heat sink is provided within the housing.

3. The optical device as claimed in claim 1 wherein the housing is at least one of fireproof and explosion proof.

4. The optical device as claimed in claim 1 wherein the housing is pressurized for operation at depths.

5. The optical device as claimed in claim 1 wherein an external connection is provided through the housing to allow connection to an external power source.

6. The optical device as claimed in claim 1 further comprising an umbilical.

7. The optical device as claimed in claim 1 wherein the fixing holds the plurality of side emitting optical fibers in butt coupled contact with an external surface of the window.

8. The optical device as claimed in claim 7 wherein the fixing is adapted to compress an end of the plurality of side emitting optical fibers against the window.

9. The optical device as claimed in claim 1 wherein a power source for powering the light emitting diode is provided in the housing.

10. The optical device as claimed in claim 9 wherein the power source comprises a battery.

11. The optical device as claimed in claim 1 wherein light emitted from the housing includes one or more communication signals or messages.

12. The optical device as claimed in claim 11 comprising means for modulating light to include one or more communications signals or messages.

13. The optical device as claimed in claim 11 comprising means for demodulating signal or message carrying light to determine one or more communications signals or messages.

14. The optical device as claimed in claim 1 wherein the fixing portion is adapted to mate with a fixing element on the plurality of side emitting optical fibers.

15. The optical device as claimed in claim 14 wherein the fixing element is releasable, thereby to allow the plurality of side emitting optical fibers to be released.

16. The optical device as claimed in claim 14 wherein fixing portion comprises a male part and a female part, one being on the housing and the other being on the plurality of side emitting optical fibers.

17. The optical device as claimed in claim 16 wherein the fixing portion comprises a bayonet connector.

18. The optical device as claimed in claim 1 wherein the light emitting diode and the window are integrated.

19. The optical device as claimed in claim 18, further including a heat sink provided within the housing, wherein the light emitting diode, the window, and the heat sink are integrated.

20. The optical device as claimed in claim 18 wherein the light emitting diode, the window, and the non-imaging light element are integrated into one component body, wherein the component body has a depth of less than 15 mm.

21. The optical device as claimed in claim 18 wherein the light emitting diode, the window, and the non-imaging light element are integrated into one component body.

22. The optical device as claimed in claim 21 wherein the housing has a housing lid and a housing body portion and the component body is located in the housing lid.

23. An optical device comprising:
a sealed waterproof housing;
at least one light emitting diode located within the waterproof housing;
a transparent window through which light emitted by the light emitting diode is transmitted;
a fixing portion for securing at least one side emitting optical fiber into a coupling position adjacent to the window to allow light from the at least one light emitting diode to pass to the at least one side emitting optical fiber, wherein the fixing portion is adapted to allow connection and disconnection of the at least one side emitting optical fiber without opening or breaking a seal of the housing; and
a non-imaging light element in the housing for coupling light from the light emitting diode into at least one side emitting optical fiber,
wherein the light emitting diode, the window, and the non-imaging light element are integrated into one component body, and the housing has a housing lid and a housing body, wherein the component body is located in the housing lid.

* * * * *